US012012699B2

(12) United States Patent
Harste (10) Patent No.: US 12,012,699 B2
(45) Date of Patent: Jun. 18, 2024

(54) PROCESS FOR MANUFACTURING COMPONENTS FROM SHREDDED POLYMER-COATED PAPER PRODUCTS

(71) Applicant: ecobrain AG, Zug (CH)

(72) Inventor: Dirk Harste, Hamburg (DE)

(73) Assignee: CHOPVALUE MANUFACTURING LTD, Vancouver (CA)

( * ) Notice: Subject to any disclaimer, the term of this patent is extended or adjusted under 35 U.S.C. 154(b) by 190 days.

(21) Appl. No.: 17/744,057

(22) Filed: May 13, 2022

(65) Prior Publication Data

US 2022/0364312 A1  Nov. 17, 2022

(30) Foreign Application Priority Data

May 14, 2021 (EP) .................................... 21173892
Jan. 20, 2022 (EP) .................................... 22152541

(51) Int. Cl.
*D21J 1/08* (2006.01)
*D21C 5/02* (2006.01)
*D21H 11/14* (2006.01)
*D21H 11/20* (2006.01)
*D21J 1/04* (2006.01)
*D21J 1/14* (2006.01)

(52) U.S. Cl.
CPC .................. *D21J 1/08* (2013.01); *D21C 5/02* (2013.01); *D21H 11/14* (2013.01); *D21H 11/20* (2013.01); *D21J 1/04* (2013.01); *D21J 1/14* (2013.01)

(58) Field of Classification Search
CPC ........ D21J 1/08; D21J 1/04; D21J 1/14; D21J 5/00; D21H 11/20; D21H 27/00; D21H 27/10; D21H 11/14; B27N 1/00; B27N 3/06; B27N 1/0209; B27N 1/0254; B27N 9/00; B27N 1/02; B27N 3/002; B27N 3/04; B27N 3/14; B27N 3/007; B32B 5/16; B32B 21/02; B32B 21/12; B32B 27/10; B32B 27/42; B32B 29/04; B32B 2250/40; B32B 2260/028; B32B 2260/046; B32B 2262/067; B32B 2307/718; B32B 2307/72; B32B 2479/00; B32B 2607/00; D21C 5/02
See application file for complete search history.

(56) References Cited

U.S. PATENT DOCUMENTS

| | | | |
|---|---|---|---|
| 3,957,572 A | 5/1976 | Eriksson | |
| 4,855,343 A | 8/1989 | Degen et al. | |
| 4,870,979 A | 10/1989 | Browning et al. | |
| 6,426,381 B1 | 7/2002 | König et al. | |
| 6,699,536 B2 | 3/2004 | Katoh et al. | |
| 6,821,614 B1 * | 11/2004 | Dubelsten .............. | B27N 3/086 428/332 |
| 7,296,684 B2 | 11/2007 | Gabl | |
| 8,052,837 B2 | 11/2011 | Basilio et al. | |
| 8,133,543 B2 | 3/2012 | Linhart et al. | |
| 10,876,255 B2 | 12/2020 | Kunugi et al. | |
| 11,198,974 B2 | 12/2021 | Kalbe et al. | |
| 2010/0166985 A1 | 7/2010 | Brockmeyer et al. | |
| 2010/0236736 A1 | 9/2010 | Brockmeyer et al. | |
| 2022/0364312 A1 * | 11/2022 | Harste ...................... | B32B 27/10 |
| 2023/0074931 A1 * | 3/2023 | Harste ...................... | D04H 1/65 |
| 2023/0227655 A1 * | 7/2023 | Harste ...................... | D04H 1/732 524/14 |

FOREIGN PATENT DOCUMENTS

| | | | | |
|---|---|---|---|---|
| EP | 1860231 A2 | | 11/2007 | |
| EP | 3396059 B1 | * | 3/2021 | .............. B41J 29/26 |
| EP | 4088898 A1 | * | 11/2022 | .............. B27N 1/00 |
| EP | 4148174 A1 | * | 3/2023 | .............. C08J 5/045 |
| JP | 08284084 A | * | 10/1996 | .............. B41J 29/26 |
| JP | 08284084 A | | 10/1996 | |
| WO | 2021047802 A1 | | 3/2021 | |

OTHER PUBLICATIONS

European Search Report, EP21173892.7, dated Nov. 19, 2021, 10 pages.

* cited by examiner

*Primary Examiner* — Jose A Fortuna (74) *Attorney, Agent, or Firm* — Sand, Sebolt & Wernow Co., LPA (57) ABSTRACT

The invention relates to a process for producing a thermoformable and/or embossable particle/polymer composite using a substrate S based on shredded polymer-coated paper and a thermoplastic polymer P, therewith providing a new method of recycling/upcycling paper waste. Furthermore, a process for the manufacturing of a molded article obtained from the paper-based particle/polymer composite and its use as an element in buildings or in furniture are disclosed.

13 Claims, 3 Drawing Sheets

Fig. 1

CPL
Paper-based polymer particle composite
CPL

Fig. 2

Melamine film
Decore paper
Paper-based polymer particle composite
Decore paper
Melamine film

Fig. 3

Paper-based polymer particle composite
Semi-finished wood fibre products

PROCESS FOR MANUFACTURING COMPONENTS FROM SHREDDED POLYMER-COATED PAPER PRODUCTS

CROSS-REFERENCE TO RELATED APPLICATIONS

This application claims priority to European Patent App. No. 21 173 892.7, filed 14 May 2021 and European Patent App. No. 22 152 541.3, filed 20 Jan. 2022, both of which are hereby incorporated by reference in their entireties.

The invention relates to a process for producing thermoformable and/or embossable particle/polymer composites and their use to prepare parts or components. In particular the particles used in the composites are derived from shredded polymer-glued or polymer-coated paper products.

BACKGROUND

One of the major challenges facing humanity in recent years is the reduction of $CO_2$ emissions in the earth's atmosphere. On the one hand, this is achieved by reducing the use of fossil fuels, but on the other hand, processes for storing $CO_2$ in the earth are also being investigated. In principle, a first step is the increased use of renewable raw materials in technical areas such as automotive, consumer goods etc., which temporarily store $CO_2$ at least for a few years and are neutral in the $CO_2$ balance in the short term during this phase of use.

These include, for example, biodegradable starch films or veneer woods which, modified accordingly, are used as paneling in car interiors.

It would be particularly desirable if not only newly produced materials could be used for such applications, but also raw materials that would otherwise be discarded as waste.

Raw materials relevant to the invention are paper products with polymer-coating or which otherwise contain polymers, e.g. as a glue material.

Paper products coated with (or otherwise containing) polymers find numerous applications, especially in paper grades whose inkjet printability can be improved by a polymer coating, i.e. all graphic papers, natural paper, coated papers or cardboard and board. The polymer is applied to the surface of the paper or cardboard, for example as an aqueous dispersion or aqueous solution, and the paper or cardboard treated in this way is dried.

Such polymer dispersions or aqueous solutions of the polymers and the coating process for paper are described in the literature, including WO 2004/096566 A1, U.S. Pat. No. 6,699,536 and WO2008/142003 A1.

Such polymer-containing (polymer-coated) paper products are produced in large quantities worldwide and are widely used as printed advertisement or catalogue materials, disposable paper products, including polymer-coated paper take-away cups, dishes, bowls, bags, and beverage cartons, or printed packages for all kind of products.

After use such polymer-containing paper products are usually burned or recycled as "waste paper" or "recovered paper". Generally, recycling means a process of converting waste materials into new materials and objects or their raw materials are turned into secondary raw materials. The recovery of energy from waste materials is often included in this concept. The recyclability of a material depends on its ability to reacquire the properties it had in its virgin or original state. A specific aspect of recycling methods is the so-called upcycling, which describes a creative reuse of the waste materials, and which is a process of transforming byproducts, waste materials, useless, or unwanted products into new materials or products perceived to be of greater quality or environmental value. The recovery of waste paper from paper products is of high economic importance in the paper industry to save resources. The term "waste-paper" or "recovered paper" is based on DIN 6730 and is therein defined as paper or cardboard that is returned from production or processing in used or unused form to be fed back into a manufacturing process as semi-finished material. In Germany alone, the recovered paper use rate, i.e. the share of recovered paper in total domestic paper production, was 65% in 2003. Usually, recovered paper is used as a secondary raw material in paper and cardboard production. However, waste paper cannot be recycled as often as desired. With each recycling cycle, the fibers are shortened due to mechanical stress and lose the ability to reconnect into a sheet structure after about 4 to 6 cycles, which in turn has a negative impact on paper strength. In addition, the contamination of the recycled paper increases with an increase in the number of recycling cycles, as inorganic and especially organic impurities, such as polymers, cannot be completely separated and consequently accumulate.

Several processes are known from the literature that deal with the production of paper pulp from waste paper. Essentially, these are the so-called deinking processes, in which the paper fiber is recovered by removing the printing ink in an alkaline medium, and the so-called pulping process, in which an aqueous waste-paper suspension is concentrated, if necessary, mechanically pulped in a kneader and then the impurities and polymers are separated from the paper fiber via sorting (for example by screen baskets). Usually, only cardboard is recycled by beating (in a so-called "re-pulper" (pulper) or drum pulper) impurities and polymers. For all other types of paper, it is now common for them to be pre-cleaned by pulping before being sent to a deinking process.

The recovery of fiber material by means of pulping has been known for a long time and is described for example in DE 1 761 864 and DE 2 413 159. The specific problem of sorting to separate the impurities from the paper fiber is disclosed in EP 1 860 231 A2 and EP 1 462 568 A1, among others. The deinking process is known, for example, from WO 2007/145932 A1.

Another process for deinking paper fibers is described in EP3396059A1. Therein, a process for recycling paper by manufacturing a sheet from paper waste is described, comprising the removal of the coloring materials from the paper fibers with particles having a specific Moh's hardness, by colliding the particles with the colored paper fibers in the process so that the particles remove the coloring materials from the fibers. In the process the deinked fibers are mixed with polymer resin particles or polymer resin powders and accumulated on a mesh belt and transported to a stretching roller to form a layered sheet. In a pressurizing and heating portion the layered fiber-polymer mixture is pressurized under heating, thereby melding the resin so that the fibers are bound through the melted resin in the web thereby forming a sheet.

JP H08 284084 describes a process of recycling waste paper by preparing a crushed waste paper powder by drying a waste paper pulp comprising the crushed paper particles in the form of flakes, wherein the dry waste paper crushed powder is mixed with thermoplastic resin pellets from which a granulated waste paper synthetic powder is formed, which is used for extrusion and injection molding, therewith providing a waste paper composite molded product formed by heating and kneading in extrusion or injection molding methods. Accordingly, in the process describe therein, the granulated waste paper synthetic powder, comprising the mixture of crushed paper particles and thermoplastic resin pellets, is first molten and then converted into the desired form by extrusion. It is described that the waste paper pulp is chemically deinked. Waste paper composite boards for TV housings, panels, interior or exterior boards for vehicles, desks, tables, buildings, floor boards, decorative panels or wall coverings or furniture components can be prepared with the molding methods described therein. However, due to the extrusion process it is not possible to prepare a pre-product with a first lower density, which is then compacted to provide a product with a second higher density.

These processes to recover (recycle) polymer-containing paper products are time and cost consuming and regardless of the method of recovered paper processing, the separation of impurities and of polymers with which the paper products are coated is insufficient. In particular, paper products coated with polymers are hardly accessible to waste-paper recycling or only at the cost of problems, since the polymers lead to deposits during the papermaking process from waste paper, in particular on parts of the paper machine, as well as to quality losses of the manufactured paper products. The deposit behavior of such polymers is exacerbated by the fact that they are usually poorly water-soluble or even water-insoluble and tend to agglomerate. Due to the necessary cleaning work, this leads to a regular standstill of the machines and in some cases even to a loss of production during the manufacturing process and accordingly to high costs.

As mentioned above, polymer-coated paper products are increasingly used in gastronomy, catering and fast-food restaurants or snack bars, for example, as paper bags for dry food or for liquids, as cardboard cups, as beverage cartons and cartons for liquids. The polymer-coating, on the one hand, provides the paper product with a certain dimensional stability and, on the other hand, makes the paper product impermeable to liquids and thus easy to handle, especially for the end consumer. Therefore, such polymer-coated paper products established as disposable packaging, which increasingly enhance the production of waste.

Packaging and paper products coated with PE (polyethylene) or polyacrylates or polystyrene acrylates or other vinyl polymers or polyesters have been known for a long time, especially in the fields of foodstuffs (e.g. for beverages), cosmetics and cleaning agents, whereby the PE film or the other polymers used can be applied as a very thin barrier coating on the inside, outside and/or also between the different paper layers. Typically, such a paper product is coated with PE film or the other polymers to be used on at least one of the two surfaces.

The disadvantage of paper products coated with PE or other polymers is that they cannot be reused in the course of conventional recycling, but only in recycling facilities developed for this purpose. Such paper products are disposable materials and cannot be fed into conventional recycling processes, as is the case for other types of paper such as newsprint and magazine paper. Usually, paper products coated with PE or the other polymers used have to be incinerated, as composting is not possible either.

Furthermore, coated packaging, especially beverage cartons, are known under the trade name Tetra Pak®. These are also cardboard packaging coated with plastics, which usually also have an aluminum layer as a liquid-repellent layer. The recycling of the individual components of a Tetra Pak® package is also problematic. These must first be collected separately from the rest of the household waste. According to the manufacturer, recycling of Tetra Pak® packaging has been possible since 2008 thanks to a new plasma technology, whereby after the Tetra Pak® has been cut into small pieces, the cardboard is first separated from the aluminum foil and the plastic wrapping with the help of water. In the following step, the aluminum foil is separated from the plastic wrapping with the help of a plasma jet without burning the plastic, whereby the packaging can thus be almost completely separated into all three components: cardboard, plastic and aluminum.

Besides the disadvantage of the high costs of all these paper recycling processes the more sophisticated separation and recycling processes can be carried out only in specialized facilities making it less suitable for recycling of the enormous amounts of arisings.

Furthermore, all of the paper products mentioned, regardless of their use as e.g. graphic papers, PE-coated paper products or Tetra Pak® still contain polymeric gluing agents. Such gluing agents, which are known e.g. from EP 0 273 770 EP 0 257 412 B2, WO 99/42490 A1 and WO 2007/000420 A1, cannot be completely separated in the known recycling processes either and lead to the same difficulties in the recovery process as the polymers with which the paper products were coated.

For ease of reference, the expression "polymer-coated paper (products)" used herein comprises all such polymer-containing paper products as described above. It is not limited to (inside or outside) surface coatings and further includes paper products, which contain polymers e.g. as a gluing material added in the paper production process. Further, for sake of clarification, it is noted that the expression "polymer-coated paper (products)" refers to the waste paper raw material, which is to be distinguished from the polymer-coated particulated waste paper prepared in the process of the invention with the thermoplastic binder, which is designated herein as "substrate S/polymer P mixture/combination" (or "polymer P coated/impregnated substrate S").

The known processes for recovering glued or polymer-coated paper fibers from paper products thus have disadvantages regardless of the type and composition of the gluing and/or coating polymers, since the polymers often cannot be completely separated from the paper fiber. In particular the huge amounts of the aforementioned polymer-coated paper products, which are used as disposables or packages in the field of food, cosmetics and cleaning agents, are not at all amenable to recycling or can only be recycled with great difficulty and at high cost.

A process for upcycling coffee grounds by producing thermoformable and/or embossable composite materials from a mixture of particulate coffee grounds and a thermoplastic polymer having a $T_g \geq 20°$ C. is described in WO2021/047802.

The object of the present invention was therefore to provide a new method for handling the arising amounts of polymer-coated paper product wastes and to provide a cost-effective process for upcycling polymer-coated paper products. The object of the invention deals with providing an upcycling process for providing not only recycled (recovered) paper but new products of higher value based on the polymer-coated paper waste. A further object of the present invention is to provide a process for producing a thermoformable and/or embossable particle/polymer composite and a particle/polymer molded part obtainable therefrom, which is based on shredded (particulated) polymer-coated paper products and can be produced at low cost. A further object relates to providing new parts for indoor applications with low formaldehyde emission. A further object of the invention was to provide a cost and energy saving process for recycling/upcycling paper waste products.

The object has been solved by developing a new process of manufacturing paper-based particle/polymer composites based on shredded polymer-coated paper products. In particular, this object is achieved by the process according to the claims.

The object of the present invention is in particular solved by a process of manufacturing a thermoformable and/or embossable paper-based particle/polymer composite using a particulate substrate S comprising shredded polymer-glued or polymer-coated paper products and at least one polymer P, comprising the following steps:
  (i) the particulate substrate S is introduced into a gas stream, then
  (ii) the particulate substrate S is contacted with an aqueous dispersion or solution of the polymer P having a glass transition temperature $Tg^P$ in the gas stream, then
  (iii) the particulate substrate S contacted with the polymer P is dried in the gas stream and deposited, then
  (iv) the obtained deposited polymer-contacted substrate is transferred into a layer, a floor or into a mold of a desired shape, and then
  (v) the polymer-contacted substrate is densified (compacted) at a temperature greater than or equal to the glass transition temperature Tg of the polymer P to form the thermoformable and/or embossable paper-based particle/polymer composite,
  wherein
    (a) the substrate S comprises shredded polymer-glued or polymer-coated paper products; and
    (b) the polymer P is thermoplastic and has a glass transition temperature $[Tg^P] \geq -20°$ C. measured according to DIN EN ISO 11357-2 (2013-09).

Furthermore, the subject matter of the present invention are the particle/polymer composites themselves, which are obtainable according to the method according to the invention, as well as their use for the manufacturing of particle/polymer moldings (molded articles), such as elements in buildings such as wall panels, room dividers, floors, tiles, counters and in furniture, as well as parts for car interiors, music instruments or any other suitable application.

DETAILED DESCRIPTION OF THE INVENTION

A characteristic feature of the process according to the invention is that it is based on shredded (particulated) polymer-coated paper products (as defined above), which allows not only the recycling thereof, but rather an upcycling to new products of high quality different from typical paper products. By using the process described herein with a substrate based on shredded (particulated) polymer-coated paper products it is further possible to prepare products like molded articles for a variety of possible applications (e.g. car fittings, molded car interior parts, parts of music instruments etc.) or elements for use in buildings, such as wall panels, room dividers, floors, tiles, counters and in furniture, and generally any parts or elements which are suitable to replace conventional parts or elements made of plastic or wood (e.g. veneers, wood-based boards like particle boards, MDF, OSB and others which are usually prepared using formaldehyde containing resins) in a much more time and energy saving way and therewith more cost effective and more environmentally friendly and sustainable.

To obtain the paper-based substrate S for the process of the invention the polymer-coated paper products are particulated, e.g. by shredding, cutting, chopping, milling, or otherwise crushing paper products, which comprise a polymer-based glue and/or a polymer-coating.

Shredded (particulate) paper products used according to the invention may have a particle size of ≤5 mm length and ≤2 mm width. The ratio length/width is preferably ≥3, more preferably ≥5 and most preferably ≥20.

In principle, all polymer-coated paper products (as defined herein) can be used. In particular, the process according to the invention is suitable for recycling (upcycling) paper products, glued and/or coated with polymers, used as paper products which are coated on one or both sides and which are used for foodstuff (e.g. coffee to-go cups), paper bags for dry foodstuffs such as e.g. coffee, tea, soup powder, sauce powder; for liquids such as cosmetics, detergents, beverages, dairy products, tube laminates, paper carrier bags, paper laminates and coextrudates for ice cream, confectionery (e.g. chocolate and muesli bars), paper tape, cardboard cups (e.g. cardboard cups for cold and hot drinks), yoghurt cups, menu trays, wrapped cardboard containers (cans, barrels), wet-strength or moisture-resistant cardboard boxes for outer packaging (wine bottles, food), fruit crates made of coated cardboard, fast food plates, clamp shells, beverage cartons and cardboard boxes for liquids such as detergents and cleaning agents, frozen food cartons, ice-cream packaging (e.g. ice-cream cups, wrap-around cartons), paper labels and banderoles, flower and plant pots, special papers (e.g. sanding papers, filter papers). Preferably, the polymer-coated paper products are polymer-glued or polymer-coated paper products selected from polymer-coated disposable paper products, including polymer-coated paper take-away cups, dishes, bowls, bags, beverage cartons or packages.

It is a specific advantage of the process of the present invention that it is not necessary to remove the polymer-coatings or glues or colorings from the waste paper for further processing as it is the case in the above described prior art processes.

In the process of the invention the waste paper products are shredded (particulated), e.g. by shredding, cutting, chopping, milling, or otherwise crushing. The particulated paper products are then treated with water and pressure at temperatures between 100 to 200° C., preferably <200° C., more preferably <180° C., even more preferably <160° C., most preferred ≤140° C. A preferred temperature range is between >110° C. and <160° C., more preferably between >110° C. and ≤140° C. The resulting paper particle pulp is preferably milled in a subsequent step to obtain even smaller paper particles. This paper particle pulp forms the substrate S of the invention, which is then introduced into the gas stream.

According to the invention, another essential component is a thermoplastic polymer P, whose glass transition temperature $Tg^P$, measured according to DIN EN ISO 11357-2 (2013-09), is ≥−20° C., preferably ≥−10° C., more preferably ≥20° C., even more preferably ≥40° C. and particularly preferably is ≥60° C.

When using thermoplastic polymers P with a glass transition temperature $Tg^P$<20° C., such as thermoplastic polymers having a $Tg^P$ in a range of −10° C. to +10° C., it is surprisingly possible to prepare particle/polymer composite materials (preforms) as well as the molded articles obtainable therefrom, which exhibit a higher elasticity, and which exhibit different insulating properties. Therefore, with the selection of thermoplastic polymers with different Tg's the properties of the resulting materials can be controlled and adjusted in accordance with the needs and desired application.

According to the invention, the thermoplastic polymer P is also referred to as a binder or binding agent.

Thermoplastic polymers P are understood to be those polymers which can be formed in a certain temperature range ($\geq Tg^P$), whereby this process is reversible, which means that it can be repeated several times by cooling and reheating. However, care must be taken to ensure that the polymer is not heated to the point where thermal decomposition of the polymer begins.

In principle, thermoplastic polymers are to be distinguished from thermosetting polymers (duroplasts), which are not reversibly deformable after their manufacture, for example by curing. These are not suitable according to the invention.

All thermoplastic polymers which have a glass transition temperature $\geq -20°$ C. determined according to the above-mentioned determination method can be used according to the process, preferably thermoplastic polymers having a glass transition temperature $\geq 20°$ C., such as acrylonitrile/butadiene/styrene copolymers, polyamides, polyacetates, homo- or copolymers of (meth)acrylates, styrene acrylates, polycarbonates, polyesters, such as polyethylene terephthalates, polystyrenes, polyether ketones, polylactic acid, ethylene/acrylic acid copolymers, or polyvinyl chlorides.

Preferably, the polymer P does not comprise intentionally added formaldehyde or structural moieties derived from formaldehyde. Standard wood-based boards like particle boards, MDF, OSB and others are usually bonded with formaldehyde containing resins (e.g. UF, PF, MUF). Formaldehyde-containing binders are also used in most cases in biobased composites. However, formaldehyde-containing resins lead to the problem of undesired formaldehyde emission. In the process according to the invention board materials can be provided with no formaldehyde emission or only very low emissions, far below the required threshold. The formaldehyde emission of the particle/polymer composite and/or the molded articles and/or laminates obtained therefrom of the present invention can be determined according to VDA 275 "Formteile für den Fahrzeuginnenraum; Bestimmung der Formaldehydabgabe" (German Association of the Automotive Industry 275, "Molded parts for vehicle interiors; Determination of formaldehyde release.")

In the process of the invention, the thermoplastic polymer P is contacted with the substrate S (comprising the shredded paper products) in a gas stream. Therefore, the polymer P is used in the form of an aqueous dispersion or an aqueous solution.

In principle, an aqueous dispersion (or solution) of the polymer P can be obtained by dissolving or dispersing the polymer per se, e.g. provided in powder, flake or fiber form. Examples are polypropylene powder, flakes or fibers.

The polymer P is advantageously used in the form of an aqueous dispersion (hereinafter also referred to as "aqueous polymer P dispersion"), produced by radically induced aqueous emulsion polymerization of ethylenically unsaturated monomers P [monomers M]. The at least one monomer M can be selected from the group comprising olefins, vinylaromatic monomers, vinyl halides, esters of vinyl alcohol and monocarboxylic acids having 1 to 18 carbon atoms, esters of $\alpha,\beta$-monoethylenically unsaturated mono- and dicarboxylic acids having 3 to 6 carbon atoms with alkanols having 1 to 12 carbon atoms, nitriles of $\alpha,\beta$-monoethylenically unsaturated carboxylic acids and $C_{4-8}$-conjugated dienes, and are selected to an extent of $\leq 25\%$ by weight from the group comprising $\alpha,\beta$-monoethylenically unsaturated mono- and dicarboxylic acids having 3 to 6 carbon atoms and amides thereof, and also monoethylenically unsaturated compounds having at least one amino, epoxy, hydroxyl, N-methylol or carbonyl group and compounds having at least two nonconjugated ethylenically unsaturated double bonds.

Aqueous dispersions of polymers P are preferably used. According to the invention, aqueous polymer solutions only play a minor role.

According to the invention, commercially available aqueous polymer dispersions can be used advantageously, which are usually offered as binders e.g. for paints, coatings or similar, e.g. acForm®, Acronal® S940, Acronal® 12 DE, Acronal® 969 (all BASF AG).

In the process of the invention the particulate substrate S and the thermoplastic polymer P are contacted with each other in a gas stream in a so-called Blowline process. A Blowline process used for preparing wood fiberboards from a thermodeformable polymer/fiber composite on the basis of lignin fibers (wood, cellulose, and plant fibers) is described in WO2017/140520. The process described therein is not used or described for upcycling polymer-coated paper products. Therein, the fibers used are natural fibers, i.e. polar fibers. In contrast, the present invention uses polymer-coated paper products, wherein the polymer-coating provides a non-polar coating/surface. The process of the invention for recycling/upcycling of paper waste products is mainly based on the Blowline process described in WO2017/140520 for fiber-/wood-based products. In principle the process conditions of the Blowline process described therein, can be applied also in the process of the present invention. However, in the process of the present invention, the preparation of the used paper-based substrate S differs from the corresponding preparation step for preparing the fiber/wood-based substrate used in WO2017/140520. Concretely, the conditions for preparing the shredded waste paper pulp are adapted as follows:

In a first shredding/milling step the paper waste products are particulated by shredding, cutting, chopping, milling, or otherwise crushing the paper products, which comprise a polymer-based glue and/or a polymer-coating. Compared to shredding lignin-fiber-/wood-products as used in WO2017/140520 this first shredding/milling can be carried out more cost and energy saving, since it is generally easier to particulate the paper products used herein than the lignin-fiber-/wood-products used in WO2017/140520. In the step of treating the particulated paper products with water and pressure (in a water tank) it is possible to use lower temperatures. When using lignin-fiber-/wood-products usually temperatures between 160 and 200° C., preferably >180° C. are applied. Further, it is possible to apply shorter dwell periods in the water tank. If lignin-fibers or particulated wood products are used longer dwell periods are required to achieve sufficient softening of the fresh wood fibers and to be able to reduce the energy in the subsequent milling step in the refiner. Since paper, such as used in the present invention, softens very quickly, the dwell periods in the water tank can be reduced significantly. Finally, less energy is needed for milling the paper-particle pulp in the refiner because the refiner gap can be set much larger. Usually, the refiner gap is set in the range of 0.1-0.15 mm when using lignin-fiber-/wood-products as in WO2017/140520. In contrast, when using the paper waste products of the invention the refiner gap can be set to >1 mm. Since paper is made from already disintegrated fibers, it is much easier to disintegrate the paper structure again.

After contacting the substrate S with the aqueous polymer P dispersion or solution the resulting substrate S/polymer P "mixture/combination" (or the polymer P coated/impregnated substrate S) is dried in the gas stream and deposited, followed by transferring the deposited dried substrate S/polymer P "combination" into a layer, a floor or into a mold having the negative form of the desired shape to be obtained. Then, the polymer-contacted substrate (the dried substrate S/polymer P "combination") is densified (compacted) at a temperature greater than or equal to the glass transition temperature Tg of the polymer P [$Tg^P$] to form the thermoformable and/or embossable paper-based particle/polymer composite of the invention. Preferably, the densification temperature is greater than the Tg of the used polymer(s).

Therein, the temperature and the polymer must be selected to provide a mixture, wherein the polymer has a tack at the Tg that effects that the substrate is sticking together.

In a preferred aspect the aqueous dispersion of the polymer P used in the process of the invention has a film forming temperature <$Tg^P$ preferably <10° C. below $Tg^P$.

In a further embodiment of the invention, it is possible to further add biofibers or particles thereof, such as bamboo, miscanthus and/or wood fibers/particles or the like, which allows an easy adjustment of the mechanical properties of the composite material, in particular with respect to rigidity and insulating properties, depending on the desired properties and application of the resulting composite materials. Such biofibers can be derived from shredded biomaterials as mentioned herein. Examples include salvage timber, sawdust, wood scraps, wood fibers, wood shavings, wood flour, wood chips, post-industrial or post-consumer wood waste, bamboo, miscanthus chips etc.

Such a further embodiment of the present invention therefore relates to a process of manufacturing a thermoformable and/or embossable paper-based particle/polymer composite, using a particulate substrate $S_p$, comprising shredded polymer-glued or polymer-coated paper products, a particulate substrate $S_b$, comprising other biomaterials such as bamboo, miscanthus or wood particles, and at least one polymer P, with the process comprising the following steps:
  (i) the particulate substrates $S_p$ and $S_b$ are together or separately introduced into a gas stream, then
  (ii) the particulate substrates $S_p$ and $S_b$ are separately or in mixture with each other contacted with an aqueous dispersion or solution of the polymer P in the gas stream, then
  (iii) the particulate substrates $S_p$ and $S_b$, contacted (separately or as a mixture) with the polymer P, are dried in the gas stream and deposited (either separately or in the form of the mixture) and, in the case of contacting, drying and depositing the substrates $S_p$ and $S_b$ separately, the separately dried and deposited polymer-coated substrates $S_p$ and $S_b$ can optionally be mixed in a desired ratio by using a blender (forming a blend),
  (iv) the obtained deposited polymer-contacted substrates $S_p$ and $S_b$ or mixtures or blends of $S_p$ and $S_b$ are transferred into one or more layers, floors or into molds of a desired shape, and then
  (v) the polymer-contacted substrates or mixture or blend are densified (compacted) at a temperature greater than the glass transition temperature Tg of the polymer P to form the thermoformable and/or embossable paper-based particle/polymer composite,
  wherein
  (a) the substrate $S_p$ comprises shredded polymer-glued or polymer-coated paper products and the substrate $S_b$ comprises other shredded biomaterials such as bamboo, miscanthus or wood particles; and
  (b) the polymer P is thermoplastic and has a glass transition temperature [$Tg^P$]≥−20° C. measured according to DIN EN ISO 11357-2 (2013-09).

Therein, in step (iv) "preparing one or more layers" comprises depositing layers of a mixture or blend of substrates $S_p$ and $S_b$ ("mixed-substrate layer(s)") as well as depositing layers comprising either of the substrates $S_p$ and $S_b$ to prepare either layers based on shredded waste paper or layers based on shredded biomaterials ("mono-substrate layer(s)"). Such mono-substrate layers can then be individually processed in step (v) or different (varying) mono-substrate layers can be layered and combined with each other to form a layered composite in step (v).

Therein, the additional particulated (e.g. shredded) biomaterial $S_b$ can be derived from bamboo, miscanthus and/or wood. These biomaterials can be added to the shredded glued paper $S_p$ singly or as a mixture of two or more different biomaterials. Examples of suitable biomaterials comprise wood chips, sawdust, salvage timber, wood scraps, wood fibers, wood shavings, wood flour, post-industrial or post-consumer wood waste, bamboo, and miscanthus.

In such embodiments the shredded substrates $S_p$ and $S_b$ can be used in suitable ratios in accordance with the desired properties of the composite. The mixing amount of paper-based substrate $S_p$ is preferably from 10 to 95% by weight based on the total amount of substrates, while the further substrate $S_b$ is admixed with $S_p$ in an amount of 5 to 90% by weight. Mixing ratios of substrate $S_p/S_b$ of 1:9 to 9:1 can be used, such as of 1:9, of 1:3, of 1:1, of 3:1 or of 9:1. A particularly preferred mixing ratio of the substrates is $S_p/S_b$ of 1:1, each by weight.

The additional biomaterials are transformed to a similar particle size as the shredded glued paper particles by using conventional methods/the methods described above.

If the shredded materials $S_p$ and $S_b$ are introduced and processed in the gas stream separately, then separate pulps of the shredded materials are prepared and each separate pulp is introduced into the gas stream, contacted with the polymer P, dried and deposited separately. The resulting dried deposited polymer-coated materials are then mixed in the desired ratio with a blender to form a blend.

Accordingly, in the following, the term "substrate or particle blend" designates such final blend of separately obtained polymer-coated particles, i.e. a blend of shredded polymer-coated paper particles and polymer-coated shredded other biomaterials. The expression "substrate S" generically designates the respective substrate(s) $S_p$ and/or $S_b$ and mixtures or blends thereof. Introducing the shredded materials $S_p$ and $S_b$ into the gas stream as a mixture and carrying out the polymer-coating, drying and depositing in one step is preferred.

According to the invention, the deposited particle layer (floor or filled mold) according to step (iv) is understood to be a layer (floor or filled mold) of densely packed particles or particle blends. The particle layer (floor or filled mold) is obtained, for example, by spreading or casting the polymer/substrate mixture or the respective blends evenly over a surface or in continuous operation on a conveyor belt (or into the desired molds). For example, the mixture or blend can be spread in a frame, e.g. with a spreading device adapted to the frame size, until the desired weight per unit area is achieved. The surface of the particle layer can then be smoothed, if desired, e.g. with a doctor blade, and can optionally be pre-compressed, e.g. with a calender roller or a press stamp adapted to the size of the frame thereby increasing the bulk density by e.g. a factor of approx. 1.1 to 3.0. The density of the densely packed layer (or molded article) and/or the pre-compressed layer (or molded article) can be calculated (g/cm³). A pre-compressed layer or molded article according to step (iv) preferably has a density of ≥0.05 and ≤0.50 g/cm³, often ≥0.05 and ≤0.30 g/cm³, and often ≥0.05 and ≤0.20 g/cm³, if necessary. This step of mechanical pre-compression is carried out at a temperature well below the glass transition temperature $Tg^P$.

If present in the form of a layer or floor the particle layer can have a thickness of ≥0.3 and ≤50.0 cm, advantageously ≥0.3 and ≤30.0 cm and especially advantageously ≥0.3 and ≤10.0 cm.

If desired, usual additives can be added to the polymer/substrate mixture or blend, e.g. biocides, flame retardants, waxes, fragrances, dyes, pigments, UV-protection agents and/or other usual additives.

If a commercially available polymer dispersion or solution is used, the polymer/substrate mixture or blend naturally contains the auxiliary substances already contained in the polymer dispersion (or solution), such as dispersants and biocides.

In the context of the invention, drying is to be understood as meaning that the residual moisture content of the obtained substrate S/polymer P mixture is reduced to ≤15 weight % and advantageously to ≤10 weight %, preferably to ≥5 and ≤10 weight %.

According to the invention, residual moisture content is understood to be the percentage difference in weight, relative to the substrate S/polymer P mixture (or blend) used, which results when 1 g of substrate S/polymer P mixture (or blend) is dried in a drying oven at 120° C. for one hour.

The particle layer or the particles filled in a mold of the desired shape is then compressed (densified) at a temperature ≥$Tg^P$, preferably >$Tg^P$, to form a thermoformable and/or embossable particle/polymer composite, which contains the shredded polymer-coated paper products. Compression (densification) is understood to mean when the particle layer (or filled mold) is compressed under pressure at a temperature ≥$Tg^P$, preferably >$Tg^P$, to form a thermoformable and/or embossable polymer/particle composite according to step (v). In the process described herein the density of the casted layers, floors or mold-shapes is not very high so that the resulting (pre-)compressed composite material is still a porous material (in contrast to e.g. extruded materials according to the above discussed prior art) and the further densification (compaction) step requires no high pressure. Accordingly, there is no risk of cracks or damages in the compression step even when carrying out the compression at a temperature equal to the polymer's Tg.

The density of the particle/polymer composite according to step (v) is increased by a factor of ≥1 and advantageously by a factor of ≥5 compared to the corresponding particle layer (filled mold) according to step (iv), depending on the particulate substrate S used. The compression/densification can be carried out in a way and to a degree that the density of the obtained paper-based particle/polymer composite is increased by a factor up to 20 compared to the corresponding polymer-contacted (optionally pre-compressed) substrate layer (or filled mold) before densification in step (v).

The paper-based particle/polymer composite obtainable in step (v) of the process of the present invention preferably has a density of 0.30 to 0.98 g/cm. In a preferred embodiment the paper-based particle/polymer composite according to step (v) has a density of 0.60 to 0.98 g/cm³.

In this context, it is important to note that the particle/polymer composite according to the invention has an advantageous planar flat shape. Of course, the particle/polymer composite according to the invention can also have any non-planar three-dimensional shape, depending on the selected press mold.

In the manufacturing of the particle/polymer composite, advantageously the weight ratio between substrate S and polymer P is between ≥2 and ≤50. Preferably, the lower weight ratio range is ≥3, more preferably ≥4. Preferably the upper weight ratio range is ≤50, preferably <30, more preferably <20.

In the manufacturing of the particle/polymer composite, advantageously the amount of the polymer P is between ≥2 and ≤30 wt. %, preferably between ≥3 and ≤25 wt. %, more preferably between ≥5 and ≤20 wt. % of polymers P (calculated as polymer, or, if a polymer dispersion is used, as the total polymer content of the dispersion) based on the quantity of the shredded substrate material (S) used. Accordingly, the amount of shredded substrate material (S) used is between ≤98 and >70, or between ≤97 and >75, or between ≤95 and >80 wt %, respectively. That means, the composite of the invention contains a very high amount of shredded substrate material (S).

By the method according to the invention, especially particle/polymer composites are accessible, having a basis weight ≥500 and ≤30000 g/m², especially advantageously ≥1000 and ≤20000 g/m² and advantageously ≥1000 and ≤10000 g/m². The thermoformable and/or embossable particle/polymer composites obtainable by the process according to the invention are flat in one preferred design form and have a non-surface-shaped three-dimensional structure in another preferred design form.

The invention also includes the (paper-based) thermoformable and/or embossable particle/polymer composites obtainable by the method according to the described process of the invention.

The paper-based particle/polymer composite obtainable with the process of the invention can then (e.g. in a next step) be used for the manufacturing of a molded article (particle/polymer molded part), which differs in its shape and/or surface structure from the thermoformable and/or embossable particle/polymer composite. Then, the paper-based particle/polymer composite can be understood as a preform or a kind of intermediate product for preparing a molded article.

Correspondingly, the invention further includes a process for the manufacturing of a particle/polymer molded article, wherein the thermoformable and/or embossable paper-based particle/polymer composite obtained in the process described above is in a subsequent step heated to a temperature ≥$Tg^P$, preferably >$Tg^P$, then brought (formed) into the desired shape and/or surface structure to obtain a shaped and/or surface-structured paper-based particle/polymer molding, which is then cooled to a temperature <$Tg^P$ while retaining the formed shape and/or surface structure.

According to the invention, the particle/polymer composite is heated to a temperature which corresponds at least to the glass transition temperature $Tg^P$ of the polymer P. With advantage, the particle/polymer composite is heated to a temperature $Tg^P$+≥10° C. and with special advantage $Tg^P$+≥30° C. and the resulting particle/polymer molding is cooled to a temperature $Tg^P$−≥10° C. and with special advantage $Tg^P$−≥30° C.

It is also important that the particle/polymer molding is produced in a preferred design form by means of a heated molding press, at least one contact surface of which has a temperature $\geq Tg^P$ and optionally a defined surface structure (i.e. a pattern protruding and/or protruding from the contact surface) and the shape of which corresponds to the negative shape of the particle/polymer molding and cooling of which takes place outside or inside the molding press. In this design, the heating and forming process take place in the heated molding press.

Of course, according to the invention, it is also possible that the particle/polymer composite is heated outside the molding press to a temperature $\geq Tg^P$ and then formed in the molding press without or with further heating to form the particle/polymer molding and, if necessary, also cooled to a temperature $<Tg^P$. In this preferred design, the heating and the forming and cooling processes take place separately.

In another preferred design, the heating process of the particle/polymer composite is carried out by passing it between two metal rollers arranged axially parallel and rotating in the direction of passage, whereby
a) at least one of the metal rollers has a defined surface structure of the contact surface to the particle/polymer composite and a temperature $\geq Tg^P$,
b) the gap between the contact surfaces of the two metal rolls is smaller than the thickness of the particle/polymer composite, and
c) the passage of the particle/polymer composite between the contact surfaces of the two metal rolls is effected at a speed corresponding to the rotational speed of the contact surfaces of the two metal rolls.

As mentioned above, it is in all described embodiments preferred to carry out the compressing and heating of the particle/polymer composite at a temperature $>Tg^P$.

It is self-explanatory for the expert that the defined surface structure of the contact surface of the at least one metal roller represents the negative of the surface structure formed on the particle/polymer molding. In the present design, the gap width corresponds advantageously to the thickness of the particle/polymer composite multiplied by a factor $\leq 0.98$, particularly advantageously by a factor $\leq 0.6$ and particularly advantageously by a factor $\leq 0.25$. In order to form optimally positive surface structures on the polymer/particle molded part, it is essential that the polymer/particle composite is passed between the contact surfaces of the two metal rolls at a speed (in m/sec) that corresponds to the rotational speed of the contact surfaces (in m/sec) of the two metal rolls. This design is particularly suitable for the manufacturing of flat, planar particle/polymer moldings with an embossed surface structure.

The thickness of a particle/polymer composite in layer form before the heating process is usually in the range $\geq 1$ mm and $\leq 10$ cm, often in the range $\geq 1$ mm and $\leq 3$ cm and often in the range $\geq 1$ mm and $\leq 1$ cm.

In a further advantageous design form, the process according to the invention is carried out in such a way that before the heating process and before the forming and/or surface structuring process, an intermediate process step is carried out in which a sheet-like decorative material with a thickness $\leq 10$ mm is applied to one and/or the other surface of the particle/polymer composite.

Figure 1:
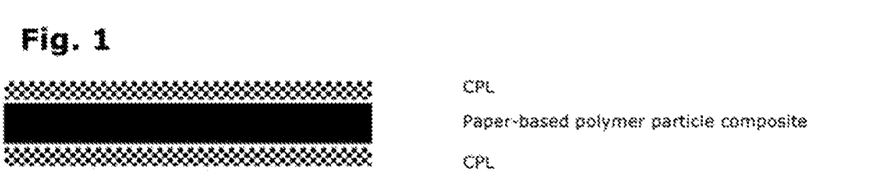
FIGS. 1 to 3 show exemplary embodiments of molded articles according to the invention laminate structures for articles molded bodies according to the invention made with the paper-based particle/polymer composite of the invention.
Figure 2:
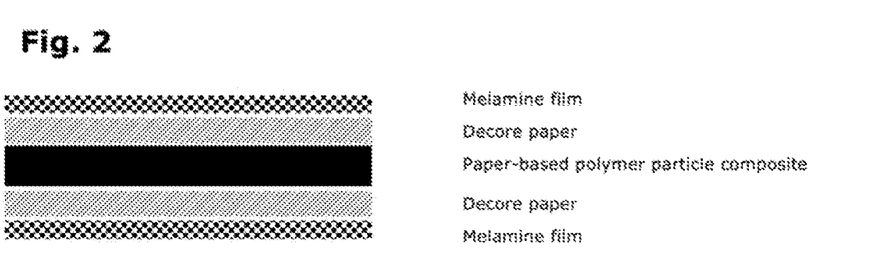

The decorative material which can be used according to the invention is advantageously a textile fabric, such as a non-woven fabric, a woven or knitted fabric made of natural or synthetic fibers, a plastic film, such as a thermoplastic polyvinyl chloride, polyolefin or polyester film, wood veneers or a HPL (high pressure laminate), CPL (continuous pressure laminate) or a decorative paper with/without melamine resin film (also known as a melamine resin overlay). Exemplary designs are shown in FIGS. 1 and 2.

If the process of the invention comprises such a further step of laminating a decorative material onto the condensed particle/polymer composite layer, the condensed particle/polymer composite layer is compressed even further in the process of applying the decorative material. This has the advantage that the first process step of producing the particle/polymer composite layer can be carried out more quickly and thus more cost-effective. In the subsequent process step of applying the decorative material the thermoformable particle/polymer composite is recompacted by a factor of $>1$, preferably 1.3.

Figure 3:
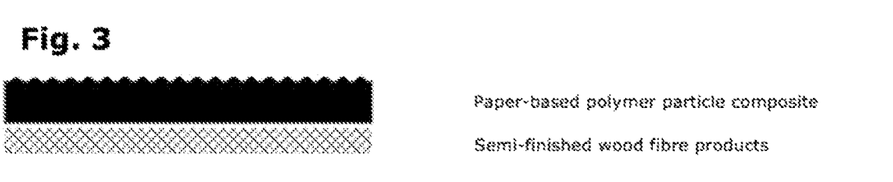

Furthermore, according to the invention, it is possible to laminate the obtained paper-based composite semi-finished product boards with common wood-based panels such as chipboard, OSB (oriented strand board) or MDF (medium density fiberboard) boards, but especially with wood fiber semi-finished product boards (e.g. Homa-Form) to create laminates with embossed structures into the surface. Such designs are shown in FIG. 3.

Therefore, the process for manufacturing a molded article according to the invention may comprise a step, wherein the thermoformable and/or embossable paper-based particle/polymer composite according to the invention is heated to a temperature $\geq Tg^P$ brought (formed) into the desired shape and/or surface structure together with a support structure and/or a protective layer made of HPL, CPL, melamine resin overlay or other usual wear/protective layers from wood-based materials industry to obtain a shaped and/or surface-structured paper-based particle/polymer molding with wear and/or protective layers which is then cooled to a temperature $<Tg^P$ while maintaining its shape and/or surface structure.

The flat decorative material usually has a thickness $\leq 10$ mm. If the flat decorative material is a textile fabric or plastic film, its thickness is usually $\leq 3$ mm, often advantageously $\leq 2$ mm and often especially advantageously $\leq 1$ mm. However, if the decorative material in sheet form is a wood veneer, HPL (high pressure laminate), CPL (continuous pressure laminate) or melamine resin film, its thickness is usually $\leq 3$ mm, often advantageous $\leq 2$ mm and often especially advantageous $\leq 1$ mm.

According to the invention, therefore, the molded articles obtainable by the aforementioned method are also included.

According to the invention, it is also important that both the process for producing the thermoformable and/or embossable particle/polymer composite and the process for producing the particle/polymer molded article (molding) can be carried out continuously or discontinuously.

The particle/polymer molded parts obtainable according to the invention have good thermal dimensional stability as well as good mechanical properties and are therefore advantageously suitable as elements in buildings, for example as wall panels, floor elements, room dividers, partition walls, ceiling panels, door leaves or wall decorating parts and also in furniture as molded furniture parts, for example as seat or back surfaces. The use of the particle/polymer moldings as elements in buildings and in furniture is therefore preferred according to the invention. Preferred is the use of the molded article as an element in structures such as wall panels, room dividers, floors, counters or in furniture. It is also possible to prepare generally any parts or elements which are suitable to replace conventional parts or elements made of plastic or wood.

Generally, the water content before pressing is the most critical parameter during pressing when using thermosetting binders. As the mixture of thermosetting binder and paper particles has to be compacted to the final product in one step, since post-compaction is not possible, the water content has to be very low at the beginning (<3%) to prevent bubble formation or bursting. Additionally, the regulation of water content may be critical due to the fact, that during cross-linking of reactive formaldehyde containing resins, e.g. UF-, PF-, MUF-resins, water is released (condensation reaction), which increases the moisture content in the pressed good which leads to higher water vapor pressure with higher risk for bubbles and blisters. To overcome this problem, e.g. the pressing of HPL products is usually carried out:
1. by placing with reactive formaldehyde-resin impregnated paper-sheets into the cold press,
2. followed by heating the press up to 140° C. or more to cure the resin,
3. then cooling down the pressed material to reduce the water vapor pressure in the HPL to avoid bubbles and blisters.

Such heating and cooling process steps require a high amount of energy and last between 60-75 minutes.

By using the pre-manufactured semi-finished thermoformable paper-based particle/polymer composites according to the invention and as described herein, such heating and cooling steps of the press are not necessary and the process can be shorten down to cycle times below 5 minutes. Additionally, the pressing can be done at lower temperatures to reduce the inner water vapor pressure. This results in an energy saving ($CO_2$ reduction) and time reduction which at the end leads to cost reduction. By the use of the thermoplastic resins defined above in the process described herein no chemical reaction is required for bonding of the paper-based particles. Accordingly, no water will be released and the inner water vapor pressure remains low.

Chipboard, i.e. wood particles, plus thermosetting binders, is therefore only produced up to a density of 0.7 g/cm$^3$. If these were compressed to higher densities during pressing and hardening of the binder in the press, bubbles and bursts would form after opening the press due to the high water vapor pressure (pressing at 180-220° C.=8-12 bar water vapor pressure), which would tear the board open and make it unusable. Due to the density below 1 g/cm$^3$ a chipboard is porous, and the water vapour can evaporate during the process. This behavior is also known in the production of HPL, CPL or synthetic resin pressed wood. PF resin impregnated papers or veneers are pressed into boards in hot presses and hardened. The residual moisture content of the impregnated paper or veneer must be below 3%, otherwise bubbles and bursts will occur.

However, in order to produce mechanically stable boards based on paper-based particle substrates as described herein and especially high percentages of them, it is necessary to obtain high densities.

Accordingly, when using the thermoplastic binders defined above in a process described herein, a pre-manufactured semi-finished thermoformable paper-based particle/polymer composite with a lower density can be produced in a first process step, which can then be pressed to higher densities in a second process step. Therefore, the invention provides a process for producing panels, based on shredded paper particles, having a very high density.

EXAMPLES

Example 1

The tests were carried out with a 12 inch refiner from Antriz and a blowline connected to it. The refiner was operated at 130-140° C. and an internal pressure of 3-4 bar (gauge pressure). The distance between the two grinding plates was 1.0 mm, and one of the grinding plates was operated at 3000 rpm. The blowline (steel pipe) connected to the refiner via a flange had an inner diameter of 3 cm and a pipe length of 30 m. The aqueous dispersion of the polymer P (binders) were then injected into the blowline at 2 bar (overpressure) via a 0.2 mm nozzle mounted on the blowline at a distance of 50 cm from the refiner outlet/blowline inlet. At the end of the blowline a cyclone separator was located through which the particulate substrate S contacted with the polymer P (i.e. the polymer-contacted substrate) were dried and cooled to a temperature of approx. 80° C. and separated into an open container.

Shredded polymer-glued or polymer-coated waste paper products were pretreated with 130-140° C. hot water/steam at 3-4 bar overpressure in the digester and used for the tests, and the mass flow rate of the pretreated shredded waste paper (particulated polymer-glued/polymer-coated paper) into the refiner (or into the blowline) was set at 30 kg per hour.

The dispersion acForm® 2888 (BASF) (a modified polyacrylate) was used as binder. The binder was injected into the blowline by means of an eccentric screw pump at a pressure of 2 bar (overpressure) via the 0.2 mm nozzle(s), the mass flows being adjusted to 5.3 kg binder (calculated as solid) and 10.6 kg (as 50% solids dispersion) per hour. The test was carried out for 1 hour in continuous steady state, during which time the shredded paper particles were contacted (sprayed) with the binder and collected in an open container.

Investigation of the mechanical properties of compressed boards (molded articles obtained from the paper-based particle/polymer composite prepared in the blowline process described above)

With the shredded and polymer (binder)-contacted paper particles obtained from the blowline according to the aforementioned experimental procedure, sheets of 22×22 cm format and different thicknesses and densities were produced:
1. 22×22 cm and 7.5 mm thickness with a density of 0.72 g/cm$^3$
2. 22×22 cm and 8.0 mm thickness with a density of 0.81 g/cm$^3$
3. 22×22 cm and 3.6 mm thickness with a density of 0.93 g/cm$^3$ For this purpose, 260, 305 and 165 g, respectively, of the shredded and polymer (binder)contacted paper particles obtained in the blowline were evenly sprinkled into a horizontally positioned wooden frame with the internal dimensions 22×22×30 cm (L/W/H). A 22×22 cm wooden plate was then placed horizontally on top of the so obtained layer or floor of the shredded and polymer (binder)-contacted paper particles in the wooden frame and pre-compacted with a central stamp. The pre-compacted layer or floor of the shredded and polymer (binder)-contacted paper particles thus obtained was then removed from the wooden frame, covered on both square surfaces with a release paper and compacted to the target thickness/density between two 3 mm thick horizontal press plates at 180° C. under pressure with a pressing time factor of 12 seconds per millimeter, the lower side of the pre-compacted layer or floor being placed on the lower horizontal press plate in each case. Subsequently, the obtained compressed paper-particle plates (sheets or boards) were allowed to cool to room temperature outside the press.

The resulting paper-particle sheets (plates or boards) are designated as test pieces PC_01, PC_02 and PC_03, respectively, depending on the target thickness as well as the target density.

The following tests were carried out with the obtained paper-particle sheets: Determination of e-modulus (modulus of elasticity), water absorption after 24 h, thickness swelling after 24 h (according to DIN EN 316) and a density profile measured (apparatus Labor-Dichtepro-filmessanlage DA-X5, GreCon).

The modulus of elasticity was determined in accordance with the ISO 178 standard. The results obtained with the various thicknesses and densities of the test pieces are listed in Table 1:

TABLE 1

| Test Piece | | PC_01 | PC_02 | PC_03 |
|---|---|---|---|---|
| Thickness | mm | 7.65 | 80.9 | 3.65 |
| Density | g/cm$^3$ | 0.72 | 0.81 | 0.93 |
| Water absorption 24 h | % | 129 | 113 | 76 |
| Thickness swelling 24 h | % | 50 | 54 | 47 |
| e-module according to ISO 178 | | | | |
| Wide | mm | 15.87 | 15.89 | 15.74 |
| Support width | mm | 120 | 130 | 74 |
| Bending e-module | N/mm$^2$ | 1071 | 2050 | 2685 |

Figure 4:
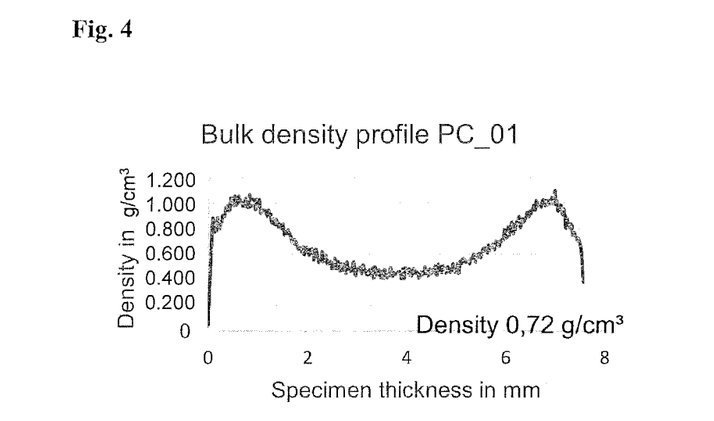
FIGS. 4 to 6 show density profiles of embodiments according to the Examples below (test pieces PC_01, PC_02 and PC_03).
Figure 5:
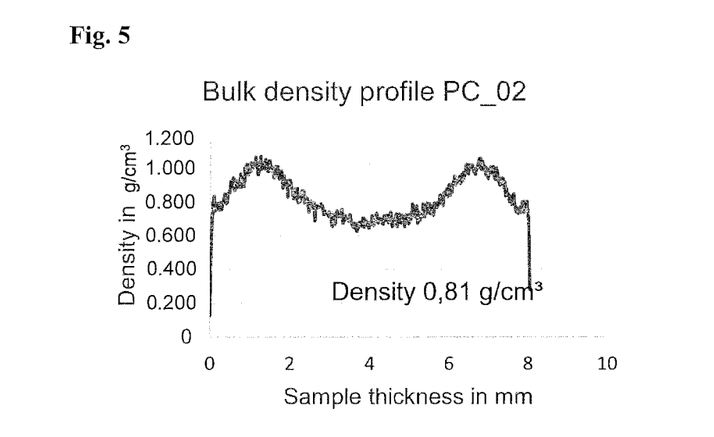
Figure 6:
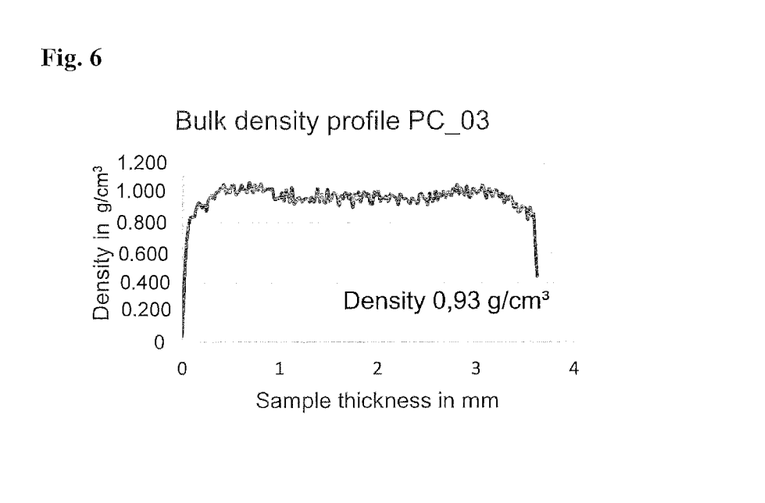

The density profiles of the test pieces PC_01, PC_02 and PC_03 are shown in the FIGS. 4, 5 and 6.

Production of semi-finished products and laminates thereof

According to the procedure described above, two more paper particle sheets, PC_HZ_01 and PC_HZ_02 were prepared from 265 g of shredded and polymer (binder)-contacted paper particles each:
  PC_HZ_01: 22×22×0.7 cm; density: 0.78 g/cm$^3$
  PC_HZ_01: 22×22×0.65 cm; density: 0.83 g/cm$^3$ In a further process step, the semi-finished products produced in this way were pressed together with impregnated core papers and a decorative paper, with the semi-finished products being further compressed at the same time. The laminates were produced by placing 3 layers of core paper (250 g/m$^2$ each) and a decorative paper (220 g/m$^2$) on the top and bottom of each of the paper-particle sheet semi-finished products and then pressing this structure together in the press at 140° C. within 180 seconds. The obtained laminated paper-particle sheets were then allowed to cool outside the press between two 10 mm aluminum plates. These laminates are designated as test pieces PC_L_01 and PC_L_02.

The following tests were carried out with the obtained paper-particle sheet laminates: Determination of e-modulus (modulus of elasticity), flexural strength, transverse tensile strength, water absorption after 24 h, thickness swelling after 24 h and a density profile measured. The results obtained with the laminated test pieces are listed in Table 2:

TABLE 2

| Test Piece | | PC_L_01 | PC_L_02 |
|---|---|---|---|
| Thickness | mm | 7.57 | 7.49 |
| Density | g/cm$^3$ | 1.07 | 1.02 |
| Water absorption 24 h | % | 18 | 26 |
| Thickness swelling 24 h | % | 0.6 | 2.4 |
| e-module according to ISO 178 | | | |
| Wide | mm | 15 | 15 |
| Support width | mm | 122 | 120 |
| Bending e-module | N/mm$^2$ | 6453 | 6468 |
| Flexural strength | N/mm$^2$ | 70 | 70 |
| Transverse tensile strength | | | |
| Force Max. | N | 3245 | 3110 |
| Tensile stress Max. | N/mm$^2$ | 1.286 | 1.221 |

Figure 7:
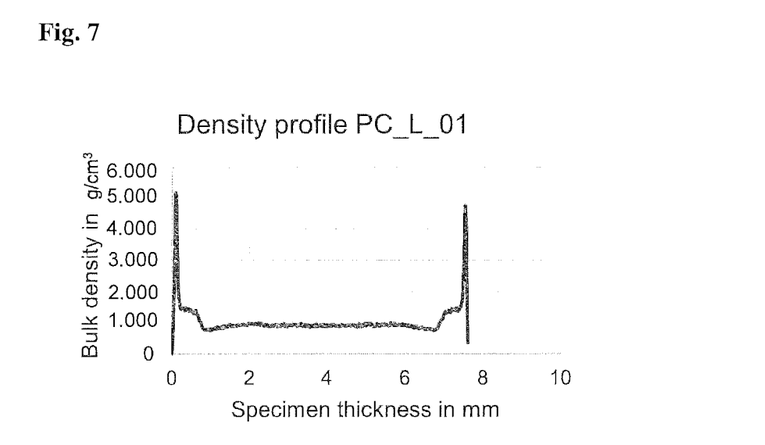
FIG. 7 shows the density profile of a laminated test piece according to the invention (PC_L_01).

The density profile of the laminated test piece PC_L_01 is shown in FIG. 7.

Example 2

Preparation of Test-Items Using Substrates of Shredded Coated Paper Shredded Wood (Paper/Wood Mixtures) with Thermoplastic Binder Raw Materials:
  Substrate $S_p$: coated paper
  Substrate $S_b$: spruce wood
  Binder: acForm 2889
  Impregnation Process: Blowline Process Description:

Similar as described in Example 1, shredded paper and the spruce wood particles are processed on a blowline with the thermoplastic binder.

Therein, the substrates $S_p$ and $S_b$ are contacted with the thermoplastic binder, dried and deposited separately.

The ratio of the respective substrate and the binder is adjusted to 85% substrate and 15% binder, each by weight.

Drying of the binder-impregnated substrates is adjusted to 8% residual moisture.

In a subsequent step the dried and deposited binder-impregnated substrates are admixed to form a blend using a blender.

The following binder-impregnated compositions (blends) are prepared:

TABLE 3

| Mixture/Blend No. | Substrate $S_p$ | Substrate $S_b$ | Binder |
|---|---|---|---|
| 1 | 100% | 0 | acForm 2889 |
| 2 | 75% | 25% | acForm 2889 |
| 3 | 50% | 50% | acForm 2889 |
| 4 | 25% | 75% | acForm 2889 |
| 5 | 10% | 90% | acForm 2889 |
| 6 | 0 | 100% | acForm 2889 |

The mixtures/blends No. 1 to 6 are used to prepare test boards.

Board Processing:

The mixtures/blends No. 1 to 6 are evenly scattered into a frame box of 22×22 cm, pre-compressed and then compressed at 180° C. to a thickness of 4 mm with a press time factor of 15 sec./mm board thickness. The resulting density is about 0.95 g/cm$^3$.

The obtained test boards are then evaluated with respect to their physical properties as listed in Table 4 and 5:

TABLE 4

| Mixture/Blend No. | Board No. | Scatter weight [g] | Board weight [g] | Board thickness [mm] | Board Density [g/cm³] |
|---|---|---|---|---|---|
| 1 | 1 | 200 | 192 | 4.2 | 0.94 |
| 2 | 2 | 200 | 193 | 4.1 | 0.97 |
| 3 | 3 | 200 | 190 | 4.1 | 0.96 |
| 4 | 4 | 200 | 191 | 4.1 | 0.96 |
| 5 | 5 | 200 | 192 | 4.2 | 0.94 |
| 6 | 6 | 200 | 192 | 4.2 | 0.94 |

TABLE 5

| Board No. | Unit | 1 | 2 | 3 | 4 | 5 | 6 |
|---|---|---|---|---|---|---|---|
| e-Module | N/mm² | 2500 | 2912 | 3281 | 3487 | 3520 | 3598 |
| deviation | N/mm² | 612 | 567 | 358 | 413 | 601 | 629 |
| bending stress | N/mm² | 29 | 36 | 40 | 52 | 54 | 58 |
| deviation | N/mm² | 7 | 6 | 9 | 12 | 14 | 18 |
| Water swelling 24 h | % | 31 | 32 | 31 | 33 | 35 | 34 |
| deviation | % | 2 | 2 | 1 | 1 | 2 | 1 |

The invention claimed is:

1. A process of manufacturing a particle/polymer composite, comprising
   (i) providing a particulate substrate S comprising
      a. shredded polymer-glued or polymer-coated paper products and
      b. at least one polymer P,
      introducing the particulate substrate S into a gas stream,
   (ii) contacting the particulate substrate S with an aqueous dispersion or solution of the polymer P having a glass transition temperature $Tg^P$ in the gas stream,
   (iii) drying and depositing the particulate substrate S contacted with the polymer P in the gas stream,
   (iv) transferring the obtained deposited polymer-contacted substrate into (a) a layer, (b) a floor or (c) into a mold, and
   (v) densifying the polymer-contacted substrate at a temperature greater than or equal to $Tg^P$ to form a particle/polymer composite, which is a thermoformable and/or embossable paper-based particle/polymer composite,
   wherein
   (a) substrate S comprises shredded polymer-glued or polymer-coated paper products; and
   (b) the at least one polymer P is thermoplastic and has a $Tg^P \geq -20°$ C. measured according to DIN EN ISO 11357-2 (2013-09).

2. The process according to claim 1, further comprising: introducing into the gas stream and contacting with the polymer P, a substrate $S_b$ comprising shredded biomaterials.

3. The process according to claim 2, wherein the shredded biomaterials are selected from the group consisting of bamboo, miscanthus or wood particles, and combinations thereof.

4. The process according to claim 1, wherein providing the particulate substrate S comprises shredding, cutting, chopping, milling, or crushing paper products, wherein the paper products comprise a polymer-based glue and/or a polymer-coating.

5. The process according to claim 1, wherein the polymer-glued or polymer-coated paper products are selected from polymer-coated disposable paper products, polymer-coated paper take-away cups, polymer-coated paper dishes, polymer-coated paper bowls, polymer-coated paper bags, polymer-coated paper beverage cartons and polymer-coated paper packages.

6. The process according to claim 1, wherein the polymer P does not comprise intentionally added formaldehyde or structural moieties derived from formaldehyde.

7. The process according to claim 1, wherein the at least one polymer P is present in the form of an aqueous dispersion of the polymer P having a film forming temperature $<Tg^P$.

8. The process according to claim 1, wherein the weight ratio of substrate S to polymer P is $\geq 2$ and $\leq 50$.

9. The process according to claim 1, wherein the paper-based particle/polymer composite obtained is in the form of a sheet and has a basis weight $\geq 500$ and $\leq 30\,000$ g/m².

10. The process according to claim 1, wherein the densification results in an increase in the density of the obtained paper-based particle/polymer composite of up to 20-fold.

11. The process according to claim 1, wherein the densification results in the obtained paper-based particle/polymer composite having a density of 0.30 to 0.98 g/cm³.

12. The process according to claim 1, further comprising:
    forming a molded article, wherein the thermoformable and/or embossable paper-based particle/polymer composite obtained in step (v) is heated to a temperature $\geq TgP$, brought into the desired shape and/or surface structure to obtain a shaped and/or surface-structured paper-based particle/polymer molding, which is then cooled to a temperature $<TgP$ while retaining the formed shape and/or surface structure.

13. The process according to claim 1, further comprising a step of forming a molded article, wherein the thermoformable and/or embossable paper-based particle/polymer composite obtained in step (v) is heated to a temperature $\geq Tg^P$ brought into the desired shape and/or surface structure together with a support structure and/or a protective layer made of high pressure laminate, continuous pressure laminate, melamine resin overlay or other usual wear/protective layers from wood-based materials industry to obtain a shaped and/or surface-structured paper-based particle/polymer molding with wear and/or protective layers which is then cooled to a temperature $<Tg^P$ while maintaining its shape and/or surface structure.

* * * * *